United States Patent [19]

Morgan et al.

[11] 4,396,221
[45] Aug. 2, 1983

[54] HINGED VEHICLE WINDOW ASSEMBLY

[75] Inventors: Cleon Morgan; John F. Thomas, Jr.; Raymond A. Meyer, all of Holland, Mich.

[73] Assignee: The Regents of the University of California, Berkeley, Calif.

[21] Appl. No.: 194,471

[22] Filed: Oct. 6, 1980

[51] Int. Cl.[3] .............................................. B60J 1/08
[52] U.S. Cl. ................................... 296/84 C; 49/490
[58] Field of Search ................ 219/10.77; 49/81, 490; 296/84 C, 44; 24/73 FT; 52/400

[56] References Cited

U.S. PATENT DOCUMENTS

| 753,967 | 3/1904 | Eustis | 296/44 |
|---|---|---|---|
| 2,436,728 | 2/1948 | Parsons | 296/44 |
| 2,502,970 | 4/1950 | Manning | 171/327 |
| 2,608,926 | 9/1952 | Helsley | 296/84 C |
| 2,679,201 | 5/1954 | Scharmen | 296/84 C |
| 2,986,793 | 6/1961 | Bright | 24/259 |
| 3,096,061 | 7/1963 | Bertell | 248/288 |
| 3,108,338 | 10/1963 | Stec et al. | 20/69 |
| 3,120,369 | 2/1964 | Gray, Jr. | 248/223 |
| 3,131,251 | 4/1964 | Ryan | 88/98 |
| 3,155,204 | 11/1964 | Campbell et al. | 189/77 |
| 3,167,825 | 2/1965 | Zoller | 20/69 |
| 3,274,740 | 9/1966 | Hall | 52/208 |
| 3,458,242 | 7/1969 | Williams | 312/258 |
| 3,638,359 | 2/1972 | Kruschwitz | 49/490 |
| 3,652,112 | 3/1972 | Panelli | 292/210 |
| 3,666,225 | 5/1972 | Weinberger | 248/205 A |
| 3,711,893 | 1/1973 | King | 16/128 |
| 3,756,636 | 9/1973 | Jackson | 285/189.36 H |
| 3,759,004 | 9/1973 | Kent | 52/400 |
| 3,774,201 | 7/1973 | Dochnahl | 52/400 |
| 3,774,363 | 11/1973 | Kent | 52/400 |
| 3,781,044 | 12/1973 | Quensnel et al. | 292/200 |
| 3,816,690 | 6/1974 | Middelmann | 219/10.77 |
| 3,827,184 | 8/1974 | Pennec et al. | 49/449 |
| 3,885,072 | 5/1975 | Zibritosky | 428/38 |
| 3,967,424 | 7/1976 | Gates | 52/208 |
| 4,010,573 | 3/1977 | Andrzejewski | 49/479 |
| 4,015,398 | 4/1977 | Bright | 52/716 |
| 4,032,740 | 6/1977 | Middleman | 219/10.77 |
| 4,042,741 | 8/1977 | Bright | 428/217 |
| 4,046,940 | 9/1977 | Prikkel | 428/313 |
| 4,072,340 | 2/1978 | Morgan | 296/84 R |
| 4,093,304 | 6/1978 | Ziegler | 296/84 D |
| 4,124,239 | 11/1978 | Horton | 292/210 |
| 4,139,234 | 2/1979 | Morgan | 296/84 R |
| 4,163,884 | 8/1979 | Kobetsky | 219/10.49 R |
| 4,167,259 | 9/1979 | Bury | 248/205 A |

FOREIGN PATENT DOCUMENTS

| 702578 | 1/1965 | Canada | 88/109 |
|---|---|---|---|
| 1015997 | 1/1966 | United Kingdom | 296/84 C |

Primary Examiner—Richard A. Bertsch
Attorney, Agent, or Firm—Poms, Smith, Lande & Rose

[57] ABSTRACT

A hinged window assembly for vehicles adapted to be installed substantially entirely from the vehicle exterior. The assembly includes a window pane and at least one hinge preferably bonded with a suitable adhesive directly to the window pane surface without any hinge securing structure extending into or through the window. In a preferred form, the hinge is formed from flexible, resilient metal and cooperates with a sealing weather strip forming a seal between the preferred glass window pane and a vehicle body. Preferably, the fastening structure for attaching the hinge to a vehicle body is concealed from view behind the assembly when viewed from the vehicle exterior.

33 Claims, 15 Drawing Figures

HINGED VEHICLE WINDOW ASSEMBLY

BACKGROUND OF THE INVENTION

This invention relates to vehicle window assemblies and, more particularly, to an improved hinged window assembly wherein the hinges are bonded directly to the surfaces of the window pane without the necessity of drilling or causing any hinged securing structure to extend through the window pane.

In recent years, it has been common to provide pivotally hinged windows in passenger automobiles, trucks or vans to facilitate ventilation. Such windows are pivoted either on a vertical or horizontal axis so that they may be opened from between a few inches to several feet. A common technique in manufacturing such windows is to drill one or more holes through the window glass near the peripheral edge of the glass and bolt a hinge plate to the glass which can then be fastened in some manner to a support on the body of the vehicle. Such holes must be drilled before the glass is tempered and substantial material loss often results because of the breakage or chipping which occurs during such drilling. In addition, such hinged structures are relatively heavy and provide a substantial structure which must be covered or trimmed over to maintain the asthetic qualities in and around the window.

More recently, window assemblies have been used including a window pane bonded to a molding strip of polyvinyl chloride and secured in a larger assembly or frame such as that shown in U.S. Pat. No. 4,139,234, assigned to the assignee of the present invention, wherein the molding strip provides a "living hinge." With the recent emphasis on vehicle weight reduction for energy conservation purposes, it was desired to provide an alternative to such hinged window assemblies which were lighter, provided equal or greater reliability to environmental and weather conditions and also could provide anti-theft and anti-vandalism security for the hinged windows. Such features were desired in an assembly in which the bulk of the hinge was kept to a minimum and the attachment of the assembly to the vehicle could be made substantially entirely from the exterior of the vehicle while keeping any fasteners concealed from the vehicle exterior after installation of the assembly.

The present invention was conceived as a solution to the above problems and as an alternative to the previously used hinged vehicle window assemblies.

SUMMARY OF THE INVENTION

Accordingly, the present invention provides a hinged window assembly for vehicles adapted to be installed substantially entirely from the vehicle exterior and characterized by the use of hinges which are secured directly to the surface of the window pane in the assembly without the necessity of drilling or extending any hinge securing structure through or into the window pane.

In one form, the invention is a window assembly including a window pane having front, back and peripheral edge surfaces, as well as a hinge means for moving the window pane between at least an open and a closed position. The hinge means are secured to at least one of the surfaces of the window pane at a specified location without any structure extending to or through the window pane and include attaching structure for attaching the hinge to a portion of a vehicle.

In another form of the invention, the invention is an assembly including a window pane, hinge means including a securing structure for securing the assembly to a vehicle, bonding means intermediate the hinge means and a surface of the window pane, and sealing means cooperating with the window pane for attachment to a portion of the vehicle and forming a weather seal between the window pane and the said vehicle portion when the assembly is installed on a vehicle and the window pane is closed.

Preferably, the hinge is formed from metal and the window pane from glass with the bonding means being a suitable metal to glass adhesive such as that sold under the trademark "Tenabond" by Illinois Tool Works, Inc. or an anerobic polyacrylate cement, a vinyl acetate/phenol formaldehyde adhesive, or an epoxy cement. Further, the hinge itself may include a channel extending around the edge of the window pane, a flexible, resilient portion allowing pivotal movement of the window pane, and one of several types of fasteners. Such fasteners include a clip with detent means received within the sealing means and securing the hinge and thus the assembly to a pinch-weld flange of a vehicle body or, a flange including an aperture for receiving a threaded fastener or the like extending into the vehicle body. Alternately, a pivot member may be provided between two portions of the hinge in place of the flexible, resilient metal section.

The hinged window of the present invention provides numerous advantages over prior known assemblies including a significant savings in weight which helps fuel conservation in modern vehicles, a greater durability and better security against vandalism and theft due to the provision of metallic hinges, the elimination of any drilling or machining procedures on the window glass itself which saves the rejection of a substantial number of windows by eliminating chipping and breakage, providing a cleaner more aesthetic appearance due to the concealment of the fastening apparatus which secures the assembly to the vehicle, and providing significant savings in installation time by allowing installation substantially entirely from the exterior of the vehicle during manufacture.

These and other objects, advantages, purposes and features of the invention will become more apparent from a study of the following description taken in conjunction with the drawings.

DESCRIPTION OF THE PREFERRED EMBODIMENTS

Referring now to the drawings in greater detail, FIGS. 1-8 illustrate various aspects of one embodiment 10 of the hinged window assembly invention. The hinged window assembly, like that shown at 10, is generally designed for use as a hinged side-lite in an automobile, truck, van or other vehicle and includes a pane of transparent, tempered glass 12 having an external contour designed to fit over a window opening such as that shown at 14 in FIG. 2. Window opening 14 is formed in the rear quarter panel of an automobile and is defined by the body sheet metal of the vehicle, specifically, pinch-weld flange 16 as is seen in FIGS. 3, 4, 6 and 7. Pinch-weld flange 16 is formed from parallel flanges spot welded together and extending from the external sheet metal 18 and internal sheet metal 20 of the vehicle body. As explained hereinafter, pinch-weld flange 16 receives the hinge members from the window assembly 10 as well as a sealing weather strip.

Assembly 10 also includes at least one and preferably a pair of hinge members 25 bonded securely around one edge 13 of the window pane 12, and in certain embodiments, a closed length of sealing weather strip 40 which cooperates with the hinge members and the window pane and is adapted to be secured on the pinch-weld flange 16. In the assemblies herein, a pair of hinges are secured to the forward portion of pinch-weld flange 16 of window opening 14 so that pane 12 pivots about an essentially vertical axis. Of course, other assemblies within the scope of the invention may be positioned for pivotal movement about a horizontal axis or axes of other orientations. Also, only one or no more than two hinge members may be used.

Figures 1, 2, 3, 3A:
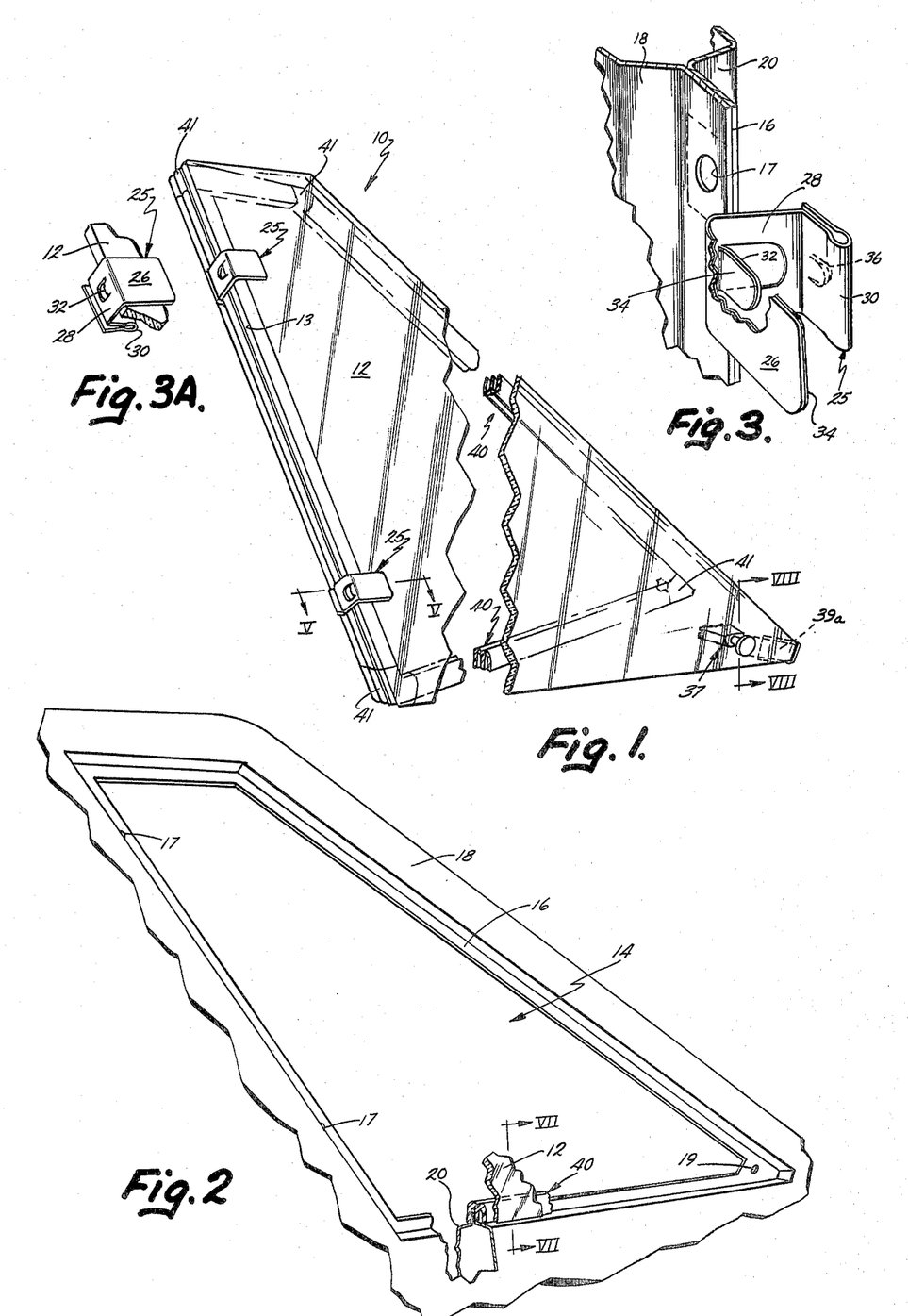
FIG. 1 is a perspective view of one embodiment of the hinged window assembly of the present invention with portions broken away and shown in section.
FIG. 2 is a perspective view of a window opening in the sheet metal body of a typical vehicle over which the window assembly shown in FIG. 1 is designed to be installed and illustrating a portion of the hinged window assembly in its installed position.
FIG. 3 is a fragmentary, perspective view of a typical vehical body pinch-weld flange and one form of a hinge member used in the hinged window assembly of the present invention.
FIG. 3a is a perspective view of the hinge member shown in FIG. 3 with a window pane secured therein.
Figures 4, 5, 6, 7, 8, 9:
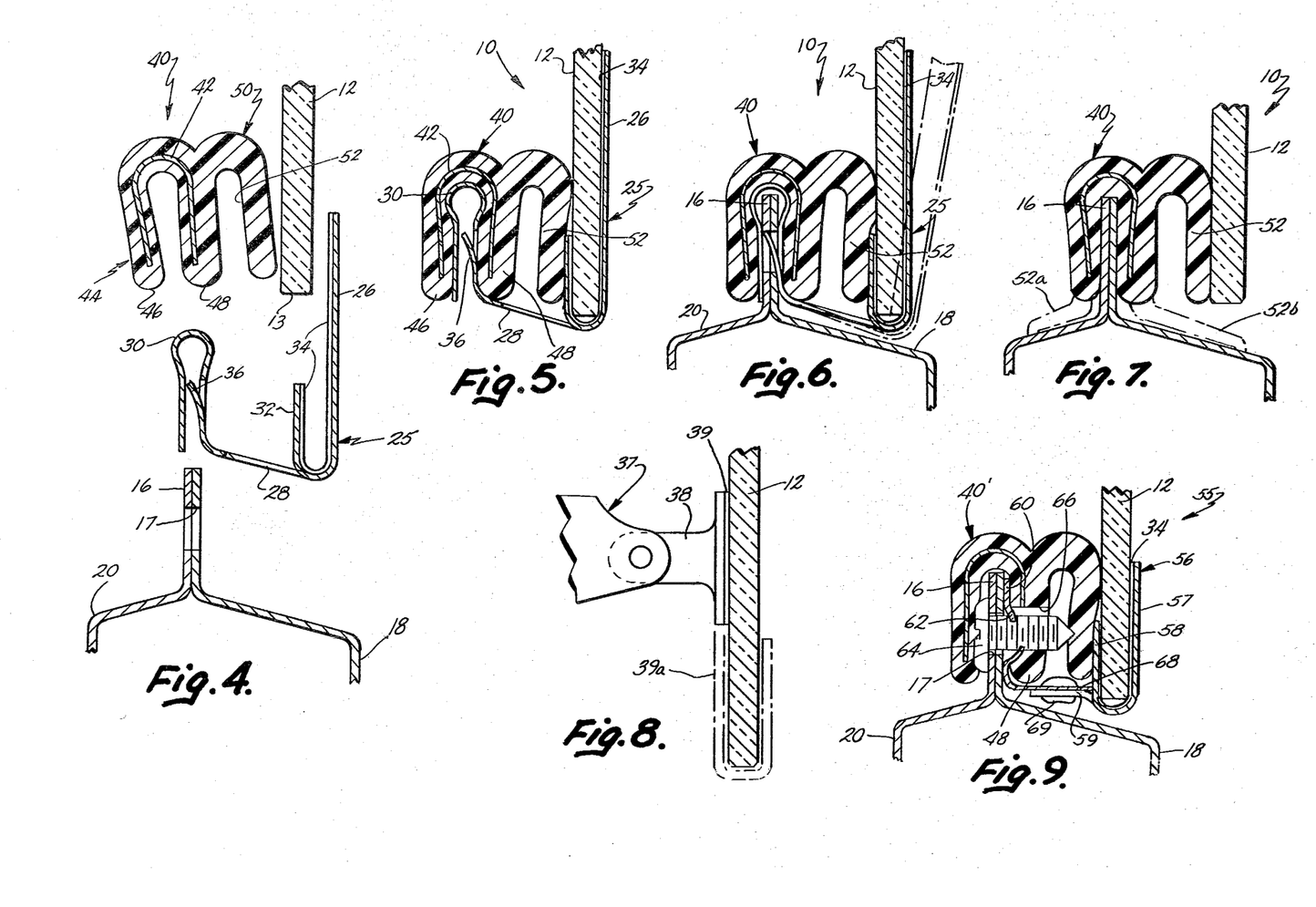
FIG. 4 is an exploded, sectional view of the several elements of one form of the hinged window assembly and a typical vehicle body pinch-weld flange over which the assembly is designed to be installed.
FIG. 5 is a fragmentary, sectional view taken along line V—V of FIG. 1 illustrating the several elements of the hinged window assembly of FIG. 4 as assembled.
FIG. 6 is a fragmentary, sectional view of the hinged window assembly of FIG. 5 assembled on the pinch-weld flange of a vehicle body.
FIG. 7 is a fragmentary, sectional side elevation of another portion of the hinged window assembly taken along line VII—VII of FIG. 2.
FIG. 8 is a fragmentary, sectional view of a pivotal latch member used with the hinged window assembly of the present invention.
FIG. 9 is a fragmentary, sectional view of a modified form of the hinged window assembly.

As is best seen in FIGS. 1, 3, 3a and 4, the preferred form 25 of the hinge members used in the present assembly is stamped from flexible resilient sheet metal such as spring steel having a gauge of 0.030-0.060 inches. Each hinge member 25 preferably includes a fastening flange 26, preferably rectangular in shape, integrally connected and extending into flexing area 28 of the hinge member. Flexing area 28 allows pivotal movement of the hinge and window and extends into a generally U-shaped attaching cup portion 30 formed by the bending of another portion of hinge 25 back on itself. Flexing portion 28 extends generally perpendicularly to fastening flange 26 and attaching clip portion 30 which are generally parallel to one another. Stamped and bent outwardly generally parallel to fastening flange 26 is a second, smaller fastening flange 32 which is spaced behind the main fastening flange 26 by a distance equivalent to the width of preferred glass window pane 12 as shown in FIG. 4. Together flange 26 and 32 form a channel which receives an edge of the window pane 12 which is secured directly to those flanges by a suitable bonding adhesive layer 34. (FIGS. 3 and 4). Bonding adhesive is preferably applied directly to the inside surfaces of flanges 26, 32 during manufacture of the hinge member 25 such that, during later manufacture of the window assembly, the window pane 12 need merely be placed within the hinge member and the adhesive activated by heat or another means to securely bond the hinge member to the glass in the desired location. No drilling or machining of the window pane is necessary for receipt of the hinges. Thus no hinge structure extends through pane 12.

The doubled back flanges of attaching clip portion 30 are preferably spaced apart by a distance slightly less than the width of the pinch-weld flange 16. The clip is then expanded to provide a friction fit of flange 16. Lanced out of one of the flanges of attaching clip portion 30 is a spring metal detent tab 36 which extends inwardly toward the center of the attaching clip. Detent tab 36 is designed to engage the edge of an aperture 17 formed through pinch-weld flange 16 in a desired location corresponding to the location of the hinge in assembly 10 as shown in FIGS. 2, 3 and 4. Once hinges 25 are secured to the window assembly, they need only be installed by sliding the attaching clip portions 30 over the edge of the pinch-weld flange 16 such that detent tabs 36 are in alignment with aperture 17. Such sliding action cams detent tabs 36 outwardly until they are received within the recess or aperture 17 and prevent the removal of hinge members 25 from the pinch-weld flange.

Also attached directly to a surface of the window pane or glass 12 is a pivot latch assembly 37 including a metallic base member 38 secured to the glass by bonding adhesive layer 39 as shown in FIGS. 1 and 8. The metal-to-glass bond for pivot latch assembly 37 is the same as that for the metal-to-glass bond for hinge members 25. Pivot latch assembly 37 is of the type disclosed in U.S. Pat. No. 4,139,234, the disclosure of which is hereby incorporated by reference, and is designed to provide an over-center-type toggle latch to retain the window in the closed position against sealing weather strip 40 or to open the window by moving it to its open position shown in FIG. 1 and in phantom in FIG. 6. Pivot latch assembly 37 may be secured to the glass other than with a bonding adhesive such as by a generally U or J-shaped flange 39a (shown in phantom in FIG. 8) which would extend around the edge of one portion of the window pane 12, or by means of a bolt or other fastener extending through a hole drilled through the glass as is shown in prior U.S. Pat. No. 4,139,234. The opposite end of pivot latch assembly 37 may be secured to pinch-weld flange 16 such as at aperture 19 generally adjacent the position of the assembly on the window pane.

A preferred adhesive system found suitable for attachment of either hinge members 25 or base 38 of pivot latch assembly 37 directly to a surface of the glass window pane 12, and especially to tempered glass, is that marketed under the trademark "Tenabond" by Illinois Tool Works, Inc. of Elgin, Illinois. Such adhesive system includes an epoxy adhesive layer 34 or 39, typically applied directly in tape form on the metal hinge member 25 or pivot latch assembly stud 38 and between that hinge member or stud and the glass surface. The stud or hinge member is pressed against the adhesive and rapidly heated using an induction heating apparatus of the type shown in any one of U.S. Pat. Nos. 3,816,690, 4,032,740, 4,163,884 or 4,167,259. Such heating apparatus activates the adhesive and causes the hinge member or stud to be rigidly and securely bonded by what is believed to be a mechanical bond directly to the glass surface. Such induction heated adhesives more securely bond metal to glass than do cold, unheated adhesives. Moreover, the induction heating system provides localized heat which is sufficiently intense to properly activate the adhesive without affecting the temper of the glass to which the hinge member or stud is being applied. Accordingly, the strength and integrity of the glass to which the hinge member or stud is bonded is not affected by the heating and the resultant metal-glass assembly is stronger and more durable than with other adhesives.

Other suitable adhesives for metal-to-glass bonds useful in the present invention include anerobic polyacrylate cement such as that disclosed in U.S. Pat. No. 3,885,072, vinyl acetate/phenol formaldehyde containing adhesives such as that disclosed in U.S. Pat. No. 2,502,970, or epoxy containing cement such as that disclosed in Canadian Pat. No. 702,578. The disclosures of the above-identified patents are hereby incorporated by reference herein.

Tests performed on a hinge member such as that shown at 25 herein and having a flange 26 of 0.75 by 0.75 inches bonded directly to a sheet of tempered glass with the above-described Tenabond adhesive system, specifically adhesive product No. TP-8051 showed that the hinge could withstand 563 p.s.i. in shear and 1000 p.s.i. in tension without separating from the glass surface after exposure to hot and cold temperature cycling, high humidity soaking and hot water soaking, and ultraviolet light (simulated sunlight). Such environmental testing of the Tenabond adhesive securing metal to glass in such conditions indicates such bonds exhibit strengths in excess of those required for proper retention in vehicles.

With reference to FIGS. 1, 2 and 4–6, the preferred form of sealing weather strip 40 is provided in the outline of pinch-weld flange 16 around window aperture 14 in the vehicle body. Sealing weather strip 40 is preferably molded in strips which are glued or otherwise secured together with corner pieces 41 (FIG. 1) to form the closed outline. It is preferably molded from flexible, resilient, sealing material such as synthetic rubber, foam rubber or the like. One suitable synthetic rubber is EPDM (a terpolymer elastomer made from ethylene-propylene terpolymer). Channel-shaped, resilient metal, reinforcing insert 42 is molded within the channel portion 44 of the strip. Channel portion 44, like the reinforcing metal insert 42, is generally U-shaped and has a pair of slightly converging legs 46, 48 which fit over both the attaching clip portion 30 of hinge member 25 and the pinch-weld flange 16. Converging legs 46, 48 press against pinch-weld flange 16 to hold the weather sealing strip 40 in place and also help to secure hinge members 25 in their proper location.

As is best seen in FIGS. 4, 5 and 6, the sealing weather strip 40 also includes a protruding integral sealing strip 50 which includes a sealing leg or flange 52 extending along the entire length of the channel portion 44 and generally parallel to channel legs 46, 48. Sealing leg 52 has an outside surface which abuts against the inside surface of window pane 12, as well as portions of the hinge member 25, such as securing flange 32, when the window is pivoted to its closed position. Such engagement effectively seals out any moisture, dirt or other foreign particles which might enter between the window and the body pinch-weld flange. Such sealing may be enhanced by including extended sealing lips such as those shown in phantom at 52a, 52b in FIG. 7 and extending from the free ends of channel legs 46, 48. Lips 52a, 52b facilitate the overall sealing function of the sealing strip 40 at locations spaced from the hinged members 25. Hinges 25 extend through such lips through appropriate apertures provided in the sealing strip.

Referring now to FIG. 9, a modified embodiment 55 of the hinged window assembly is shown. Embodiment 55 is similar in all respects to embodiment 10 or the window assembly, wherein like numerals indicate like parts, except for the flexing area and attaching portions of hinge member 56. Hinge member 56 includes channel-like fastening flanges 56, 58 similar in all respects to flanges 26, 32 in embodiment 10. These flanges are secured to the front and back surfaces of glass window pane 12 with a suitable adhesive bonding layer 34 as described above. Hinge member 56 provides a single attaching flange 60 extending generally parallel to flanges 57, 58 and including a formed aperture 62 designed to mate with the threads of a threaded fastener 64 extending through aperture 17 in pinch-weld flange 16. Aperture 66 is provided through leg 48 of sealing member 40' which otherwise is exactly similar to sealing member 40 described above. The channel portion of the sealing member 40' is thus placed over flange 60 with fastener 64 extending through aperture 66 such that the sealing strip 40' is in the proper location to seal against the inside surface of window pane 12 as shown in FIG. 9. Flange 68, extending from securing flange 60, is riveted at two spaced locations on either side of central fastening flange 58 to the flange 59 extending from the channel portions 57, 58 with rivets 69. Thus, when window assembly 55 is pivoted, the entire window pane will move via the flexing which occurs in flange 68 adjacent its corner with securing flange 60, while the window pane and securing portions of the hinge member 56 are held thereto by means of rivets 69.

Figure 10:
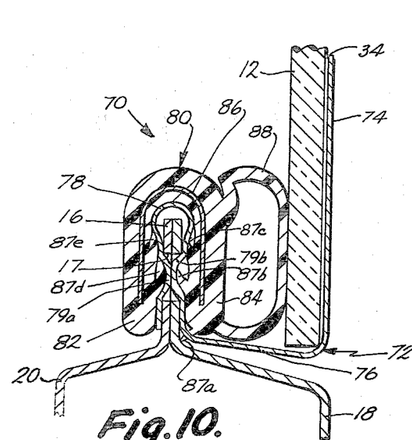
FIG. 10 is a fragmentary, sectional view of another modified form of the hinged window assembly.

As shown in FIG. 10, another embodiment 70 of the hinged window assembly includes both a modified hinge member 72 and a modified sealing weather strip 80. Hinge member 72 includes a single fastening flange 74 which extends along and is bonded to the front surface of glass window pane 12 by a suitable adhesive layer 34 as described above. Hinge member 72 does not include any central, opposing fastening flange on the back surface of the glass, however. The hinge member includes a flexing portion 76 extending at a slightly acute angle to fastening flange 74 which extends into an attaching clip portion 78 having depressed detent areas 79a, 79b adapted to be received in aperture 17 of pinch-weld flange 16. Depressed, detent areas 79a, 79b are not lanced out of the sheet metal clip portion 78 but rather are offset and connected continuously with clip portion 78. These detent areas provide a double, positive lock on the pince-weld flange.

Strip sealing member 80, which is preferably formed from synthetic rubber-like strip member 40, includes a generally U-shaped channel portion formed by legs 82, 84 reinforced by an internal, resilient metallic, reinforcing insert 86 formed in a U-shape and molded therewithin. The inside surfaces of legs 82, 84 include lips or flanges 87a, b, c, d and e which provide a sealing function and engage the exterior surfaces of attaching clip portion 78 and the pinch-weld flange 16 as indicated in FIG. 10. A hollow or bulbous, flexible sealing portion 88 extends integrally from the exterior side of weather strip 80 against the inside surface of glass pane 12 to complete the sealing of the assembly between the glass and pinch-weld flange 16.

Figure 11:
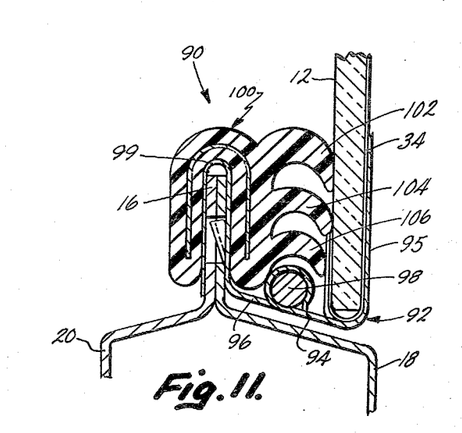
FIG. 11 is a fragmentary, sectional view of another modified form of the hinged window assembly.

Embodiment 90 of the window assembly is shown in FIG. 11 and includes modified hinge member 92 and a modified weather sealing strip 100. Hinge member 92 is similar in most respects to hinge member 25 except for the inclusion of a hinge pivot formed by mating, rolled cylindrical hinge plate portions 94, 96 extending from the opposing, glass window pane retaining section 95 and the attaching clip sections 99 of the hinge member. A pivot pin 98 is inserted through the mating rolled portions to allow pivotal movement of the glass pane 12 to which the retaining hinge section 95 is secured. Attaching clip portion 99 is substantially similar to attaching clip portion 30 of member 25.

Sealing strip 100 is similar to strip 40 except for the inclusion of series of three, generally parallel, curved sealing strips 102, 104 and 106 having free ends which engage the inside surface of the window pane adjacent its peripheral edge for sealing purposes. These sealing flanges are curved for resiliency against the inside surface of glass 12 and to provide clearance room for the pivot hinge portion as shown in FIG. 11.

Figure 12:
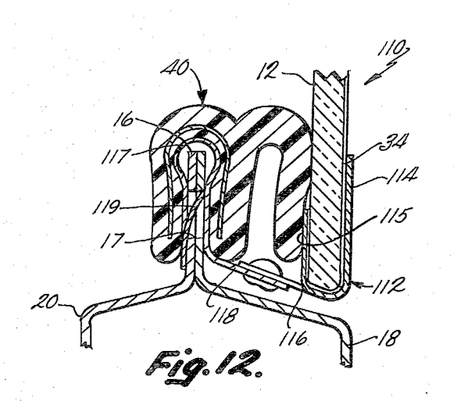
FIG. 12 is a fragmentary, sectional view of yet another modified form of the hinged window assembly.

Embodiment 110 of the hinged window assembly, where like numerals indicate like parts to those embodiments described above, also includes a modified hinge member 112 which is similar in all respects to hinge member 25 except that it is formed in two parts with the glass window pane retaining section 114 having flanges 116 spaced on either side of retaining flange 115 and riveted to flange 118 of the attaching clip portion 117. Clip portion 117 includes a detent member 119 for retention in aperture 17 of the pinch-weld flange 16. The sealing weather strip member used in this embodiment is the same as strip 40 used in embodiment 10.

Figure 13:
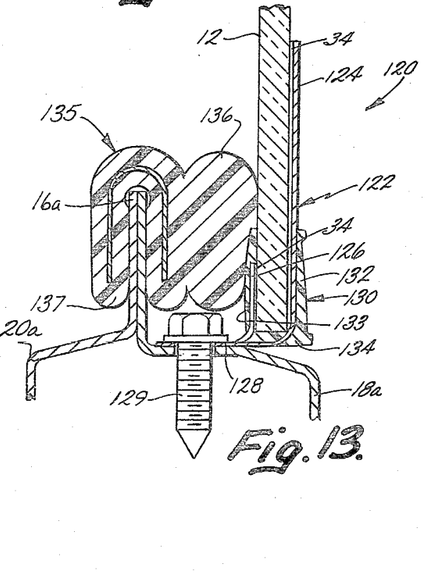
FIG. 13 is a fragmentary, sectional view of a further modification of the hinged window assembly.

In FIG. 13, embodiment 120 of the hinged window assembly includes both a modified hinge member 122 and a modified sealing weather strip 135. Hinge member 122 includes a generally rectangular retaining flange 124 which is bonded to the front surface of glass window pane 12 by means of adhesive layer 34 in the manner described above. Offset toward the back surface of the hinge from the center of the flange 124 is a spaced retaining flange 126. An adhesive layer is also included on the inside surface of flange 126. Flanges 124, 126 merge into an attaching flange 128 which includes an aperture therethrough receiving a sheet metal bolt 129 extending into the body sheet metal of the vehicle. In this case, the body sheet metal is formed from exterior sheet 18a and interior sheet 20a forming a pinch-weld flange 16a which does not include any aperture therethrough.

Molded around the entire peripheral edge of window glass 12, and about hinge member 122, is an edge trim or casing 130 molded from a suitable resinous plastic such as polyvinyl chloride to provide a finished trim around the entire periphery of the window pane. Trim or casing 130 includes an exterior or front flange 132, a rear or interior flange 133, and a peripheral edge portion 134, all of which directly engage the glass surfaces and are bonded thereto in a molding process for permanent retention.

Sealing weather strip 135 is similar to strip 40 except that in place of the sealing flange 52, a solid, flexible, bulbous sealing portion 136 which engages the inside surface of glass window pane 12 is included integrally with the channel-like portion 137 which secures the strip over pinch-weld flange 16a.

Figure 14:
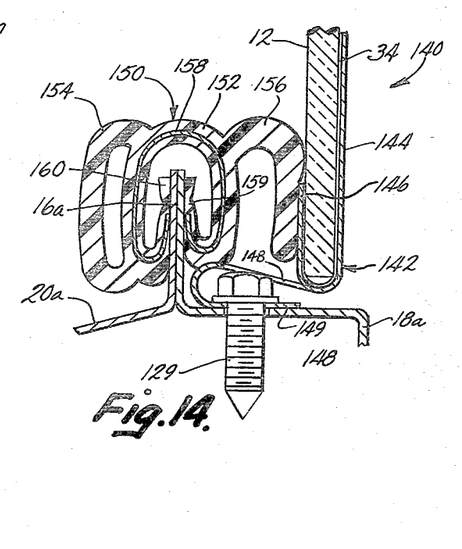
FIG. 14 is a fragmentary, sectional view of another modified form of the hinged window assembly.

Embodiment 140 of the hinged window assembly is shown in FIG. 14 and includes modified hinge members 142 and sealing weather strip 150. Hinge members 142 include a channel-like glass window pane retaining section having front flange 144 and rear flange 146. Rear flange 146 is bent upwardly out of an attaching flange 148 to form an aperture through flange 148. Flange 148 doubles back on itself in a generally U-shape and receives a securing screw 129 through the aperture in that flange and through flange portion 149 into the sheet metal of the vehicle body to retain the glass and hinge member assembly thereto. The proximity of the edge of the window pane retaining section of hinge 142 to sheet metal 18a effectively conceals screw 129 from sight after installation and prevents its removal unless weather strip is removed or assembly 140 is flexed inwardly beyond its normal position. Also the U-shaped bend between flanges 148, 149, together with the clearance opening through flange 148 for the head of bolt 129, allow greater movement than in other hinge members. Glass pane 12 is also bonded to the retaining portions of the hinge member by a suitable adhesive layer 34 as described above.

Sealing weather strip 150 includes a hollow central attaching portion 152 and bulbous sealing members 154, 156 on either side. Sealing flange 156 is substantially similar to sealing flange 52 in strip 40. The central attaching portion 152 includes a modified metallic reinforcing insert 58 centered within molded attaching legs 159, 160 which extend downwardly and curve back upon themselves to retain and clamp pinch-weld flange 16a therebetween as shown in FIG. 14.

Figure 15:
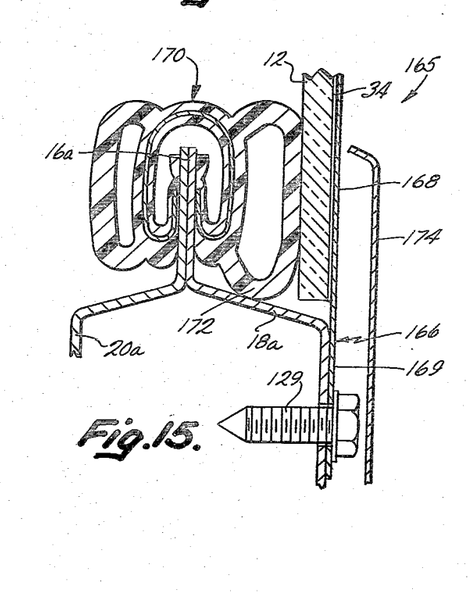
FIG. 15 is a fragmentary, sectional view of yet another modified form of the hinged window assembly of the present invention.

A final embodiment 165 of the hinged window assembly is shown in FIG. 15 and includes a substantially rectilinear hinge member 166 which includes a retaining end 168 bonded to the front surface of glass window pane 12 by a suitable adhesive layer 34 as described above and an opposing retaining end 169 having an aperture therethrough which receives a retaining screw 129 extending into the vehicle body sheet metal. Seated over pinch-weld flange 16a is a sealing weather strip 170 which is substantially similar to strip 150 shown in FIG. 14 except for the inclusion of a continuous exterior sealing flange 172 which forms a closed bulbous portion engaging both the inside surface of glass window pane 12 as well as the shoulder of the recess leading to pinch-weld flange 16a on exterior sheet metal body portion 18a. In order to conceal fastener 129 for hinge 166, a metal covering 174 extending from the roof or another portion of the vehicle may extend over the fastener 129 and a substantial portion of hinge member 166 to a position substantially equivalent to the end of pinchweld flange 16a as shown in FIG. 15.

As will now be understood, hinged window assemblies 10, 55, 70, 90, 110, 120, 140, and 165 all provide concealed fastening of the assembly to a vehicle body because the attaching portions of the hinge members are concealed behind the assembly, or are covered by an adjoining body portion when the assembly is secured in a vehicle body. Viewing of the assembly from the exterior side 18 or 18a of the vehicle does not reveal how the hinge members are secured to the vehicle. In addition, the assemblies provide a complete seal around the entire window opening and, when the window is in its closed postion, an effective seal around the entire periphery of the glass is provided. Moreover, the metal hinges provide security against vandalism and theft because the window cannot be removed merely by cutting away the weather strip. In addition, the assembly provides distinct assembly advantages during manufacture of the vehicle since it can be applied substantially entirely from the exterior of the vehicle with perhaps only a final fastening step being required from the vehicle interior. For example, in FIG. 9 screws 64 are applied from the vehicle interior as a final step. Also, the assembly is substantially finished when installed and need not be provided with any additional, separate pieces of trim.

Accordingly, various embodiments including modifications of the flexible resilient hinge members and the cooperating sealing weather strips may be used within the concept of this invention. It will be appreciated that other modifications of both the hinges and the sealing strips could be made within the spirit of the invention.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows.

1. A hinged window assembly for vehicles adapted for installation substantially entirely from the exterior of the vehicle comprising:
   a window pane having front, back and peripheral edge surfaces;
   hinge means for moving said window pane between at least an open and a closed position;
   bonding means intermediate said hinge means and said window pane for rigidly securing said hinge means directly to said window pane;
   said hinge means being secured to at least one of said surfaces of said window pane at a specified location with said bonding means without any structure extending into or through said window pane and including means for attaching said hinge means to a portion of a vehicle.

2. The hinged window assembly of claim 1 wherein said hinge means includes at least one hinge member.

3. The hinged window assembly of claim 2 wherein said window pane is glass; said hinge member is metal; said bonding means including an adhesive sufficient to adhere metal to glass.

4. The hinged window assembly of claim 3 wherein said adhesive is chosen from the group of adhesives which include anerobic polyacrylate cement, vinyl acetate/phenol formaldehyde, and epoxy cement.

5. The hinged window assembly of claim 3 wherein said bonding means includes at least activatable epoxy cement adapted to activation by induction heating.

6. A hinged window assembly for vehicles adapted for installation substantially entirely from the exterior of the vehicle comprising:
   a window pane having front, back and peripheral edge surfaces;
   hinge means for moving said window pane between at least an open and a closed position, said hinge means being secured to at least one of said surfaces of said window pane at a specified location without any structure extending into or through said window pane and including means for attaching said hinge means to a portion of a vehicle; said hinge means including at least one hinge member;
   bonding means intermediate said hinge member and said window pane for rigidly securing said attaching means directly to said window pane;
   said window pane being glass; said hinge member is metal; said bonding means including an adhesive sufficient to adhere metal to glass;
   said hinge member including at least one hinge plate formed from resilient metal, said plate including a flexible, resilient portion which is sufficiently flexible to allow movement of said window pane between said open and closed positions; said bonding means securing said hinge plate to said front surface of said window pane adjacent said peripheral edge surface, said front surface adapted to face outwardly of the vehicle when said assembly is installed in a vehicle.

7. The hinged window assembly of claim 6 wherein a retaining portion of said hinge plate is secured to said front window surface, said flexible portion being intermediate said retaining portion and said means for attaching said hinge means to a portion of a vehicle, said flexible portion being spaced from said window pane.

8. The hinged window assembly of claim 6 wherein said hinge plate includes flange means forming a channel for receiving and securing a portion of a peripheral edge of said window pane; said bonding means being intermediate interior portions of said flange means and said window pane in said channel and securing said hinge plate to both said front and back surfaces of said window pane.

9. The hinged window assembly of claim 7 or claim 8 wherein said means for attaching said hinge to a portion of a vehicle include a fastener concealed behind said assembly when said assembly is installed in a vehicle.

10. The hinged window of claim 9 wherein said fastener is a clip adapted to be received over a flange of a sheet metal vehicle body, said clip including detent means for engagement with a recess in the vehicle body flange to hold said clip on the vehicle body flange.

11. The hinged window of claim 6 wherein said means for attaching said hinge means to a portion of a vehicle include a flange having an aperture therethrough adapted to receive a fastener.

12. A hinged window assembly for vehicles adapted for installation substantially entirely from the exterior of the vehicle, said window assembly being in combination with a vehicle body, said combination comprising:

a window pane having front, back and peripheral edge surfaces;

hinge means for moving said window pane between at least an open and a closed position, said hinge means being secured to at least one of said surfaces of said window pane at a specified location without any structure extending into or through said window pane and including means for attaching said hinge means to a portion of a vehicle;

said vehicle body including means defining a window opening for receiving said hinged window assembly; sealing means between said hinged window assembly and vehicle body for preventing entry of any water or contaminants therebetween; and said means for attaching said hinge means to a vehicle portion engaging said means defining said window opening to retain said hinged window assembly on said vehicle body.

13. A hinged window assembly for vehicles adapted for installation substantially entirely from the exterior of the vehicle comprising:

a window pane;

hinge means for moving said window pane between at least an open and a closed position and secured to at least one surface of said window pane, said hinge means including securing means for securing said assembly to a vehicle;

bonding means intermediate said hinge means and said one surface of said window pane for securing said hinge means to said window pane; and sealing means cooperating with said window pane for attachment to a portion of a vehicle and forming a weather seal between said window pane and the said vehicle portion when said assembly is installed on the vehicle and said window pane is in its closed position.

14. The hinged window assembly of claim 13 wherein said hinge means includes at least one hinge member; said bonding means being intermediate said hinge member and said window pane for rigidly securing said hinge member directly to said window pane.

15. The hinged window assembly of claim 14 wherein said window pane is glass; said hinge member is metal; and said bonding means include an adhesive sufficient to adhere metal to glass.

16. The hinged window assembly of claim 15 wherein said adhesive is chosen from the group of adhesives which include anerobic polyacrylate cement, vinyl acetate/phenol formaldehyde, and epoxy cement.

17. The hinged window assemby of claim 15 wherein said bonding means includes a heat activatable epoxy cement adapted for activation by induction heating.

18. The hinged window assembly of claim 13 wherein said securing means are concealed behind said assembly when said assembly is installed on a vehicle.

19. The hinged window assembly of claim 13 wherein said seaing means include receiving means for receiving a portion of said hinge means whereby said sealing means are secured on said hinge means adjacent said window pane for sealing engagement therewith when said window pane is closed.

20. The hinged window assembly of claim 19 wherein said sealing means is formed from flexible, resilient sealing material and includes channel means for receiving a flange of a vehicle body adjacent a window opening and an integral sealing member extending along said channel means for engaging said window pane.

21. The hinged window assembly of claim 20 wherein said securing means include a clip adapted to be received over the body flange and being received within said channel means; said channel means including a channel shaped metal insert therewithin reinforcing and helping to retain said channel means over said clip and vehicle body flange when installed thereover.

22. The hinged window of claim 21 wherein said clip includes detent means for engaging a recess in a vehicle body flange.

23. The hinged window assembly of claim 20 wherein said securing means includes a flange for receiving a fastener to said vehicle body.

24. The hinged window assembly of claim 23 wherein said flange is concealed behind said assembly when said assembly is installed in a vehicle.

25. The hinged vehicle assembly of claim 23 wherein said flange is said portion of said hinge means which is received within said receiving means of said sealing means.

26. The hinged window assembly of claim 13, 15, 18 or 19 wherein a peripheral edge surface of said window pane includes a trim member extending along the edge of said window pane to provide said assembly with a finished appearance.

27. The hinged window assembly of claim 26 wherein said trim member is molded from a resinous plastic around said edge and over a portion of said hinge means.

28. The hinged window assembly of claim 13 including latch means secured to said window pane at a position spaced from said hinge means for pivoting and securing said window pane in its open and closed positions about said hinge means.

29. The hinged window assembly of claim 13 wherein said hinge means includes a first member bonded to said window pane with said bonding means, a second member including said securing means, and means pivotally interconnecting said first and second members.

30. The hinged window assembly of claim 13 wherein said hinge means includes at least one hinge plate formed from resilient metal, said plate including a flexible, resilient portion which is sufficiently flexible to allow movement of said window pane between said open and closed positions; said bonding means securing said hinge plate to said front surface of said window pane adjacent said peripheral edge surface, said front surface adapted to face outwardly of the vehicle when said assembly is installed in a vehicle.

31. The hinged window assembly of claim 30 wherein a retaining portion of said hinge plate is secured to said front window surface, said flexible portion being intermediate said retaining portion and said means for attaching said hinge means to a portion of a vehicle, said flexible portion being spaced from said window pane.

32. The hinged window assembly of claim 30 wherein said hinge plate includes flange means forming a channel for receiving and securing a portion of a peripheral edge of said window pane; said bonding means being intermediate interior portions of said flange means and said window pane in said channel and securing said hinge plate to both said front and back surfaces of said window pane.

33. The hinged window assembly of claim 13 in combination with a vehicle body, said vehicle body including means defining a window opening for receiving said hinged window assembly; said securing means engaging said means defining said window opening to retain said hinged window assembly on said vehicle body.

* * * * *

UNITED STATES PATENT AND TRADEMARK OFFICE
CERTIFICATE OF CORRECTION

PATENT NO. : 4,396,221
DATED : August 2, 1983
INVENTOR(S) : Cleon Morgan, John F. Thomas, Jr., Raymond A. Meyer It is certified that error appears in the above-identified patent and that said Letters Patent is hereby corrected as shown below:

Cover Page:

Assignee: "The Regents of the University of California, Berkeley, Calif." should be -- Donnelly Mirrors, Inc., Holland, Mich. --

Cover Page:

Attorney, Agent, or Firm: "Poms, Smith, Lande & Rose" should be -- Price, Heneveld, Huizenga & Cooper --

Column 10, line 6:

"at least" should be -- a heat --

Column 10, line 7:

"to" should be -- for --

Column 11, line 56:

"seaing" should be -- sealing --

Signed and Sealed this

Eighth Day of November 1983

[SEAL]

Attest:

GERALD J. MOSSINGHOFF

Attesting Officer     Commissioner of Patents and Trademarks